G. J. RUSSLER.
FORK.
APPLICATION FILED JULY 24, 1908.
923,709.
Patented June 1, 1909.
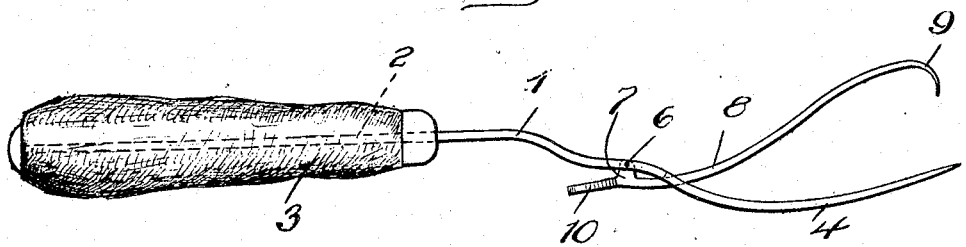
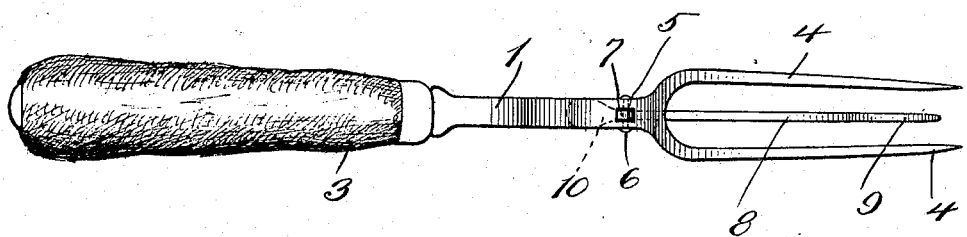
Witnesses
Samuel Payne
O. H. Butler
Inventor
G. J. Russler
By H. Evert
Attorneys

UNITED STATES PATENT OFFICE.

GEORGE J. RUSSLER, OF PITTSBURG, PENNSYLVANIA.

FORK.

No. 923,709.  Specification of Letters Patent.  Patented June 1, 1909.

Application filed July 24, 1908. Serial No. 445,228.

*To all whom it may concern:*

Be it known that I, GEORGE J. RUSSLER, a citizen of the United States of America, residing at Pittsburg, in the county of Allegheny and State of Pennsylvania, have invented certain new and useful Improvements in Forks, of which the following is a specification, reference being had therein to the accompanying drawing.

This invention relates to forks, and more particularly to a fork that can be advantageously used in handling beef and similar meats.

The primary object of my invention is to provide a fork with a hook-shaped pivoted tine, whereby a piece of roast beef or similar meat can be positively gripped, thereby preventing the piece of meat from becoming accidentally disengaged from the fork.

A further object of this invention is to provide a simple and inexpensive fork that can be easily manipulated to firmly grip a piece of meat, said fork consisting of elements of a strong and durable construction, easily assembled.

The above objects are obtained by a structure that will be presently described and then specifically pointed out in the appended claim.

In the drawings:—Figure 1 is an elevation of my fork, and Fig. 2 is a plan of the same.

Referring to the drawings in detail, 1 designates the body of the fork which is flat and has one end provided with a contracted shank 2 upon which is secured a handle 3. The other end of the body 1 depends downwardly in a curvilinear manner and terminates in an enlarged portion which is bifurcated to provide two curved parallel tines 4. The depending curvilinear portion of the body 1 in close proximity to the inner ends of the tines 4 is provided with a slot 5. Extending through the latter is a pivoted tine 8 having its outer end formed with a hook 9 and its rear end with a thumb piece 10. The inner portion of the tine 8 in close proximity to the handle piece 10 is formed with an upwardly extending lug 6 which projects into the slot 5. The lug 6 is pivotally connected to the forward end of the body 1, the pivot of the lug 6 being substantially in the same plane as the termini of the tines. The hooked end 9 of the tine 8 is arranged rearwardly of the free ends of the tines 4 and the said tine 8 is of compound curvature in contour while the tines 4 are bow-shaped.

After the tines 4 have been stuck into a piece of meat, the thumb piece 10 is pressed to move the hook-shaped end 9 of the pivoted tine 8 into engagement with the piece of meat between the tines 4, whereby said piece of meat cannot become accidentally disengaged from the tines 4. The tine 8 is released from the piece of meat by inserting the thumb under the piece 10 and forcing the same upwardly, at which time the piece of meat can be easily removed from the tines 4.

The body 1 and the tines of my fork are constructed of light and durable metal, while the handle can be made of wood or a suitable material.

Having now described my invention what I claim as new, is:—

A fork comprising a flat body portion having one end constituting a shank and its other end depending downwardly in a curvilinear manner, a handle secured to the shank of the body, said depending portion of said body terminating in an enlarged bifurcated portion constituting a pair of tines, each of said tines being bow-shaped, said depending curvilinear portion of said body provided with a slot in close proximity to the inner ends of the tines, a longitudinally extending tine of compound curvature having one end provided with a hook arranged in a plane at the rear of the outer ends of said pair of tines, said tine of compound curvature having its rear end provided with a handle and further provided with a vertically extending lug projecting in said slot and pivoted to the depending curvilinear portion of said body.

In testimony whereof I affix my signature in the presence of two witnesses.

GEORGE J. RUSSLER.

Witnesses:
 MAX H. SROLOVITZ,
 K. H. BUTLER.